(12) United States Patent
Cui et al.

(10) Patent No.: US 11,905,926 B2
(45) Date of Patent: Feb. 20, 2024

(54) METHOD AND APPARATUS FOR INSPECTING WIND TURBINE BLADE, AND DEVICE AND STORAGE MEDIUM THEREOF

(71) Applicants: ENVISION DIGITAL INTERNATIONAL PTE. LTD., Singapore (SG); SHANGHAI ENVISION DIGITAL CO., LTD., Shanghai (CN)

(72) Inventors: Weiyu Cui, Shanghai (CN); Shu Wei, Shanghai (CN); Qingsheng Zhao, Shanghai (CN); Zhongji Yin, Shanghai (CN); Yong Ai, Shanghai (CN); Dong Ao, Shanghai (CN); Zhimeng Wang, Shanghai (CN)

(73) Assignees: ENVISION DIGITAL INTERNATIONAL PTE. LTD., Singapore (SG); SHANGHAI ENVISION DIGITAL CO., LTD., Shanghai (CN)

( * ) Notice: Subject to any disclaimer, the term of this patent is extended or adjusted under 35 U.S.C. 154(b) by 0 days.

(21) Appl. No.: 17/790,078

(22) PCT Filed: Dec. 28, 2020

(86) PCT No.: PCT/SG2020/050785
§ 371 (c)(1),
(2) Date: Jun. 29, 2022

(87) PCT Pub. No.: WO2021/137760
PCT Pub. Date: Jul. 8, 2021

(65) Prior Publication Data
US 2023/0123117 A1 Apr. 20, 2023

(30) Foreign Application Priority Data
Dec. 31, 2019 (CN) .............................. 201911420554

(51) Int. Cl.
*F03D 17/00* (2016.01)
*G06F 18/22* (2023.01)

(52) U.S. Cl.
CPC ............. *F03D 17/00* (2016.05); *G06F 18/22* (2023.01); *F05B 2260/83* (2013.01); *F05B 2270/709* (2013.01); *F05B 2270/81* (2013.01)

(58) Field of Classification Search
CPC ........ G06F 18/22; G01N 29/12; G01N 29/46; F03D 17/00; F05B 2260/83; F05B 2270/709; F05B 2270/81
See application file for complete search history.

(56) References Cited

U.S. PATENT DOCUMENTS 6,785,637 B1 * 8/2004 Wobben ................. F03D 17/00
702/33
8,041,540 B2 * 10/2011 Kerber .................... F03D 17/00
702/56

(Continued)

FOREIGN PATENT DOCUMENTS

CL 200701545 5/2007
CN 106468244 A 3/2017

(Continued)

OTHER PUBLICATIONS

Verstraete, D. et al. "Deep Learning Enabled Fault Diagnosis Using Time-Frequency Image Analysis of Rolling Element Bearings", Shock and Vibration, vol. 2017, Article ID 5067651, 17 pages, 2017. https://doi.org/10.1155/2017/5067651 (Year: 2017).*

(Continued)

*Primary Examiner* — Topaz L. Elliott
(74) *Attorney, Agent, or Firm* — Crowell & Moring LLP; John C. Freeman

(57) ABSTRACT

A method and apparatus for inspecting a wind turbine blade. The method includes: acquiring a sound signal generated by an impingement of wind on the wind turbine blade using a (Continued)

sound acquisition device; generating a frequency spectrogram corresponding to the sound signal; and obtaining a damage recognition result of the wind turbine blade from the frequency spectrogram by performing image recognition on the frequency spectrogram based on a damage recognition model. With the method, a damage type of the wind turbine blade is accurately recognized based on the frequency spectrogram without manual inspection. Therefore, human resources are saved. In addition, the health state of the wind turbine blade can be monitored in real time.

9 Claims, 5 Drawing Sheets

(56) References Cited

U.S. PATENT DOCUMENTS

| | | | |
|---|---|---|---|
| 2004/0236538 A1* | 11/2004 | Wobben | F03D 17/00 702/188 |
| 2008/0206052 A1 | 8/2008 | Volkmer | |
| 2008/0319692 A1* | 12/2008 | Davis | G01H 3/005 324/76.19 |
| 2011/0135442 A1* | 6/2011 | Kerber | F03D 17/00 415/2.1 |
| 2014/0278151 A1 | 9/2014 | Newman | |
| 2017/0051725 A1 | 2/2017 | Wang et al. | |
| 2019/0032641 A1 | 1/2019 | Stoltenjohannes | |
| 2019/0178705 A1* | 6/2019 | Kishi | G01H 3/08 |
| 2020/0252412 A1* | 8/2020 | Prasad Koppisetti | G01R 29/023 |
| 2020/0409653 A1* | 12/2020 | Das | G06N 3/045 |
| 2021/0055266 A1* | 2/2021 | Stead | F03D 17/00 |

FOREIGN PATENT DOCUMENTS

| | | | | |
|---|---|---|---|---|
| CN | 108122562 A | * | 6/2018 | G06K 9/6268 |
| CN | 109505741 A | * | 3/2019 | F03D 17/00 |
| CN | 109977920 A | * | 7/2019 | |
| CN | 110 148400 A | | 8/2019 | |
| CN | 110111328 A | | 8/2019 | |
| CN | 110487549 A | * | 11/2019 | F03D 17/00 |
| CN | 112083077 A | * | 12/2020 | F03D 17/00 |
| CN | 112324629 A | * | 2/2021 | F03D 17/00 |
| CN | 110985310 B | * | 3/2021 | |
| CN | 112727704 A | * | 4/2021 | |
| CN | 114593023 A | * | 6/2022 | F03D 17/00 |
| DE | 100 65 314 A1 | | 7/2002 | |
| EP | 2131037 A2 | * | 12/2009 | F03D 17/00 |
| JP | 2018-021491 A | | 2/2018 | |
| WO | WO 2015/065873 A2 | | 5/2015 | |

OTHER PUBLICATIONS

BoschNA. SoundSee: Seeing potential repairs with sound. Nov. 30, 2018. www.youtube.com/watch?v=QZEbkiJSf3A (Year: 2018).*

CodeEmporium. Sound play with Convolution Neural Networks. Feb. 12, 2018. https://www.youtube.com/watch?v=GNza2ncnMfA (Year: 2018).*

Pandhare, V., "Convolutional Neural Network Based Rolling-Element Bearing Fault Diagnosis for Naturally Occurring and Progressing Defects Using Time-Frequency Domain Features," 2019 Prognostics and System Health Management Conf., Paris, France, May 2019, pp. 320-326, doi: 10.1109/PHM-Paris.2019.00061 (Year: 2019).*

International Search Report, dated Mar. 25, 2021, pp. 1-4 issued in International Patent Application No. PCT/SG2020/050785, Intellectual Property Office of Singapore, Singapore.

Written Opinion, dated Mar. 23, 2021, pp. 1-4, issued in International Patent Application No. PCT/SG2020/050785, Intellectual Property Office of Singapore, Singapore.

International Preliminary Report on Patentability dated Jul. 15, 2021 (20 pages) issued in International Patent Application No. PCT/SG2020/050785, Intellectual Property Office of Singapore, Singapore.

Notice of Preliminary Rejection (7 pages) dated Oct. 31, 2022 from corresponded Korean Application No. 10-2022-7026225.

First Examination Report dated Apr. 28, 2023 (3 pages) out of corresponding Australian Application No. 2020416094.

Search Report dated Aug. 17, 2023 (13 pages including English translation) out of corresponding Chilean Application No. 202201768.

Search Report dated Sep. 21, 23 (3 pages) out of corresponding Malaysian patent application No. PI2022003479.

Examination Report No. 2 (4 pages) out of corresponding Australian Application No. 2020146094, dated Jun. 15, 2013.

Supplementary European Search Report (7 pages) dated Jan. 11, 2023 issued by the European Patent Office out of corresponding European Patent Application No. 20910705.1.

* cited by examiner

METHOD AND APPARATUS FOR INSPECTING WIND TURBINE BLADE, AND DEVICE AND STORAGE MEDIUM THEREOF

This application is a national application based on Patent Cooperation Treaty Patent Application No. PCT/SG2020/050785, filed on Dec. 28, 2020, the entire contents of which are incorporated herein by reference.

This application claims under 35 U.S.C. § 119(a) the benefit of the filing date of Chinese Patent Application No. 201911420554.6, filed on Dec. 31, 2019, the entire contents of which are incorporated herein by reference.

BACKGROUND OF THE INVENTION

Field of Invention

Description of Related Art

In response to the appeal of the world environmental organization, China is committed to the development and usage of environmentally-friendly energy, such as wind power generation with mature technologies.

The wind power generation depends on a wind turbine, and wind turbine blades determine the wind catching capacity and efficiency of the wind turbine. Therefore, the state monitoring of the wind turbine blades is of great significance. A traditional method for inspecting the wind turbine blade is a manual inspection method, in which the wind turbine blade is regularly inspected by a technician by eye observation and sound discrimination.

This manual inspection method has high operation and maintenance costs, and fails to monitor the health state of the wind turbine blade in real time.

SUMMARY

Embodiments of the present disclosure provide a method and apparatus for inspecting a wind turbine blade, and a device and a storage medium thereof, which can reduce the operation and maintenance costs of the manual inspection method and monitor the health state of the wind turbine blade in real time.

According to an aspect of the present disclosure, a method for inspecting a wind turbine blade is provided, wherein the wind turbine blade is a blade in a wind power generation device, the wind power generation device further including a tower provided with a sound acquisition device. The method includes:

acquiring a sound signal generated by an impingement of wind on the wind turbine blade using the sound acquisition device, wherein the sound signal includes a sound signal generated by sliding of air between blades in the case that the wind impinges on the wind turbine blade;

generating a frequency spectrogram based on the sound signal; and obtaining a damage recognition result of the wind turbine blade by performing image recognition on the frequency spectrogram based on a damage recognition model, wherein the damage recognition model is obtained by training a neural network model.

According to another aspect of the present disclosure, an apparatus for inspecting a wind turbine blade is provided, wherein the wind turbine blade is a blade in a wind power generation device, the wind power generation device further including a tower provided with a sound acquisition device. The apparatus includes:

an acquiring module, configured to acquire a sound signal generated by an impingement of wind on the wind turbine blade using the sound acquisition device, wherein the sound signal includes a sound signal generated by sliding of air between blades in the case that the wind impinges on the wind turbine blade;

a generating module, configured to generate a frequency spectrogram based on the sound signal; and a recognizing module, configured to obtain a damage recognition result of the wind turbine blade by performing image recognition on the frequency spectrogram based on a damage recognition model, wherein the damage recognition model is obtained by training a neural network model.

According to another aspect of the present disclosure, a wind power generation device is provided. The wind power generation device includes:

a sound acquisition device; a memory communicably connected to the sound acquisition device; and a processor communicably connected to the memory, wherein the sound acquisition device is configured to acquire a sound signal generated by an impingement of wind on a wind turbine blade of the wind power generation device, and store the sound signal in the memory;

the memory is configured to store an executable instruction and the sound signal; and the processor is configured to load and execute the executable instruction stored in the memory to perform the method for inspecting the wind turbine blade as described above.

In a still further aspect, a non-transitory computer-readable storage medium is provided. The computer-readable storage medium stores at least one instruction, at least one program, a code set, or an instruction set therein, wherein the at least one instruction, the at least one program, the code set, or the instruction set, when loaded and executed by a processor, causes the processor to perform the method for inspecting the wind turbine blade as described above.

The technical solutions according to the embodiments of the present disclosure at least achieve the following beneficial effects:

In the method, the sound signal generated by the impingement of the wind on the wind turbine blade is acquired using the sound acquisition device; the frequency spectrogram corresponding to the sound signal is generated; and the damage recognition result of the wind turbine blade is obtained from the frequency spectrogram by performing image recognition on the frequency spectrogram based on the damage recognition model. Thus, a damage type of the wind turbine blade is accurately recognized based on the frequency spectrogram without manual inspection. Therefore, human resources are saved. In addition, the health state of the wind turbine blade can be monitored in real time. Moreover, in this method, the damage of the wind turbine blade is recognized based on the sound signal without depending on any wind turbine operating data, such that the machine calculation amount during the detection of the damage of the wind turbine blade is reduced.

BRIEF DESCRIPTION OF THE DRAWINGS

For clearer descriptions of the technical solutions in the embodiments of the present disclosure, the following briefly introduces the accompanying drawings required for describing the embodiments. Apparently, the accompanying drawings in the following description show merely some embodiments of the present disclosure, and a person of ordinary skill in the art may still derive other drawings from these accompanying drawings without creative efforts.

DETAILED DESCRIPTION

For clearer descriptions of the objectives, technical solutions and advantages in the present disclosure, embodiments of the present disclosure are described in detail below in combination with the accompanying drawings.

Figure 1:
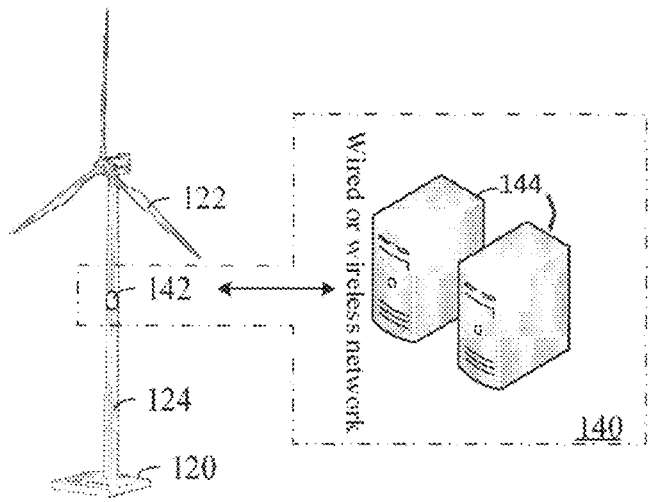
FIG. 1 is a structural diagram of a wind power generation system according to one exemplary embodiment of the present disclosure.

Referring to FIG. 1, a structural diagram of a wind power generation system according to one exemplary embodiment of the present disclosure is shown. The wind power generation system includes a wind power generation device (i.e., a wind turbine) 120 and a wind turbine blade inspection device 140.

The wind power generation device 120 includes wind turbine blades 122 and a tower 124. Wind impinges on the wind turbine blade 122 to generate wind energy, and the wind power generation device 120 converts the wind energy into electric energy and stores the electric energy into an energy storage device. The tower 124 is configured to support other device structures of the wind power generation device. For example, the wind turbine blades 122 are connected to a top end of the tower 124 by a hub.

The wind turbine blade inspection device 140 includes a sound acquisition device 142 and a cluster of background servers 144. The sound acquisition device 142 is disposed on the tower 124. Illustratively, the sound acquisition device 142 is disposed on a tower door. Optionally, the sound acquisition device 142 includes a sound sensor or a microphone.

The sound acquisition device 142 is connected to a background server 144 over a wired or wireless network. The sound acquisition device 142 is configured to acquire a sound signal generated by sliding of air between blades in the case that the wind impinges on the wind turbine blade, and transmits the sound signal to the cluster of background servers 144. The cluster of background servers 144 is configured to store the sound signal and load and execute an executable instruction to perform the method for inspecting the wind turbine blade according to the present disclosure.

It should be noted that the sound acquisition device 142 is connected to a processing box. A processor is disposed in the processing box and is capable of compressing the sound signal. The sound acquisition device 142 is further connected to the background server cluster over a wired or wireless network. The sound acquisition device 142 compresses the acquired sound signal by the processing box and then transmits the processed sound signal to the cluster of background servers 144.

In some embodiments, the cluster of background servers 144 is further provided with a display screen for displaying a damage degree and a damage type of the wind turbine blade.

In some embodiments, the cluster of background servers 144 is further provided with an alarm device. When the background server cluster 144 determines that the wind turbine blade is damaged, the cluster of background servers 144 controls the alarm device to give an alarm. In some other embodiments, the cluster of background servers 144 may control the alarm device to give a corresponding alarm according to the damage type of the wind turbine blade, and different damage types of the wind turbine blade correspond to different alarms.

Figure 2:
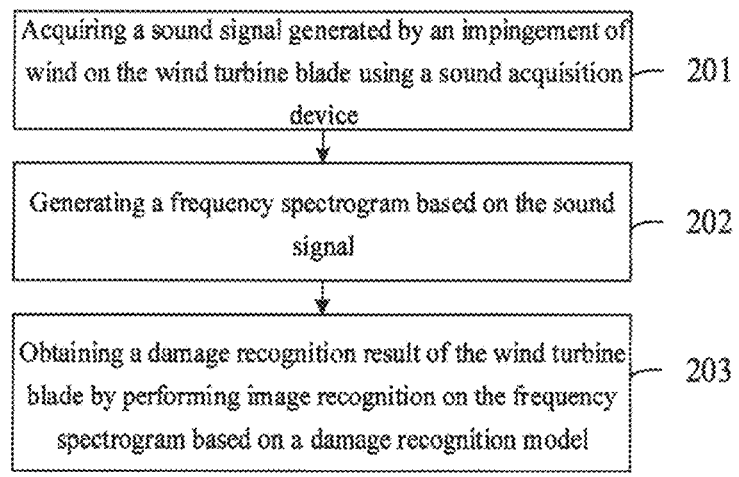
FIG. 2 is a flowchart of a method for inspecting a wind turbine blade according to one exemplary embodiment of the present disclosure.

Referring to FIG. 2, a flowchart of a method for inspecting a wind turbine blade according to one exemplary embodiment of the present disclosure is shown. The method is applicable to the wind power generation system shown in FIG. 1 and includes the following steps.

In step 201, a sound signal generated by an impingement of wind on the wind turbine blade impinges is acquired using the sound acquisition device.

The sound signal includes a sound signal generated by sliding of air between blades in the case that the wind impinges on the wind turbine blade. Illustratively, the sound acquisition device acquires the sound signal generated by the impingement of the wind on the wind turbine blade, and transmits the sound signal to the processing box. The sound signal is compressed by the processing box, and then is transmitted to the background server by the processing box.

The background server stores the sound signal in a memory. When executing the method for inspecting the wind turbine blade, the background server acquires the sound signal generated by the impingement of the wind on the wind turbine blade from the memory.

In step 202, a frequency spectrogram is generated based on the sound signal.

The background server obtains the frequency spectrogram corresponding to the sound signal by performing short-time Fourier transform on the sound signal. Illustratively, different colors may be used to represent different sound amplitudes during the drawing of the frequency spectrogram.

Optionally, the wind power generation device may include m wind turbine blades, each having a corresponding frequency spectrum region, and the background server may generate the segmented frequency spectrogram in units of wind turbine blades, where M is a positive integer.

Exemplary steps are as follows.

1) A signal envelope is extracted from a time domain signal diagram formed by the sound signal by calling a signal analysis algorithm.

The background server extracts the signal envelope from the time domain signal diagram formed by the sound signal, wherein the signal envelope refers to a curve that has at least one point tangent to each of a curve family in the time domain signal diagram; and determines the position of a point, where a wave trough appears on the signal envelope, in the time domain as a segmentation point.

The signal analysis algorithm is configured to analyze the time domain signal diagram of the sound signal to obtain the signal envelope. Illustratively, the above signal analysis algorithm may include a transfer function, such as a Hilbert transfer function. Optionally, the background server extracts the signal envelope from the time domain signal diagram based on the Hilbert transfer function.

2) The position of the point, where the wave trough is located on the signal envelope, in the time domain is determined as the segmentation point.

Figure 3:
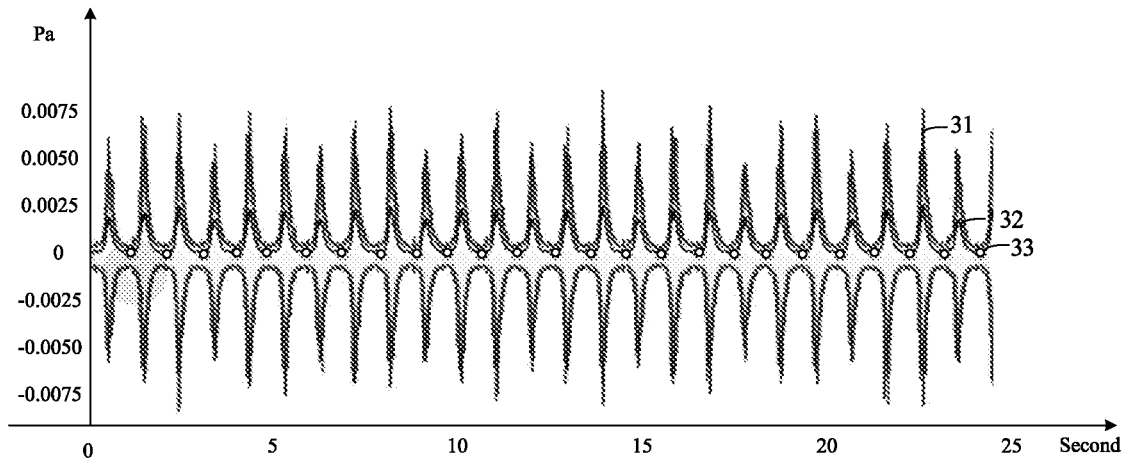
FIG. 3 is a time-domain signal diagram of a sound signal according to one exemplary embodiment of the present disclosure.

Illustratively, as shown in FIG. 3, the background server generates the time domain signal diagram 31 based on the sound signal, extracts the signal envelope 32 from the time domain signal diagram 31 based on the Hilbert transfer function, and determines a point 33 where each wave trough is located on the signal envelope 32. The position of the point 33 in the time domain is the segmentation point. In the time domain signal diagram, a part between the two adjacent segmentation points indicates the time domain signal diagram in the case that the wind impinges one wind turbine blade.

3) The sound signal is converted into the frequency spectrogram and the frequency spectrogram is segmented based on the segmentation point to obtain the segmented frequency spectrogram.

In some embodiments, the background server converts the sound signal into the frequency spectrogram based on short-time Fourier transform or Laplace transform, that is, the background server converts a time domain signal of the sound signal into a frequency domain signal based on short-time Fourier transform or Laplace transform to form the frequency spectrogram; and segments the frequency spectrogram based on the segmentation points on a time axis to obtain n frequency spectrum regions of the wind turbine blade, where n is a positive integer. In the frequency spectrogram, a frequency spectrum region between the two adjacent segmentation points refers to a frequency spectrum in the case that the wind impinges on one wind turbine blade.

Figure 4:
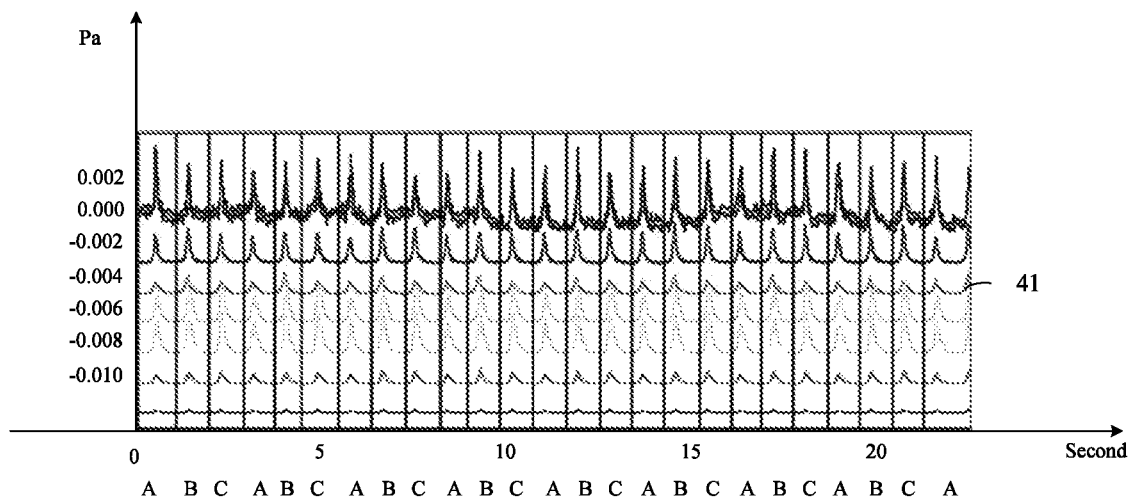
FIG. 4 is a frequency spectrogram of a sound signal according to one exemplary embodiment of the present disclosure.

Illustratively, as shown in FIG. 4, 8 curves in the frequency spectrogram 41 are sound signal curves of the wind turbine blade on different frequency bands respectively, and the frequency spectrogram is segmented into 25 frequency spectrum regions based on the segmentation points. As the wind turbine blades include three wind turbine blades and the above 25 frequency spectrum regions correspond to the three wind turbine blades respectively. The three continuous frequency spectrum regions correspond to three different wind turbine blades. The $(3m-2)^{th}$ frequency spectrum region is a frequency spectrum region of the wind turbine blade A, the $(3m-1)^{th}$ frequency spectrum region is a frequency spectrum region of the wind turbine blade B, and the $3m^{th}$ frequency spectrum region is a frequency spectrum region of the wind turbine blade C, where m is a positive integer.

In step 203, a damage recognition result of the wind turbine blade is obtained by performing image recognition on the frequency spectrogram based on a damage recognition model.

The damage recognition model is configured in the background server; and the background server determines a damage type of the wind turbine blade from the frequency spectrogram by performing image recognition on the frequency spectrogram based on the damage recognition mode. Optionally, the background server determines the damage type of the wind turbine blade from the segmented frequency spectrogram by performing image recognition on the segmented frequency spectrogram based on the damage recognition model.

In some embodiments, the damage recognition result includes the damage type of the wind turbine blade. The damage type includes at least of blockage of a drainage hole of the wind turbine, cracking of a blade protection film, corrosion of a front edge of the blade, fracture of a root of the blade, blade whistling, and lightning damage.

Figure 5:
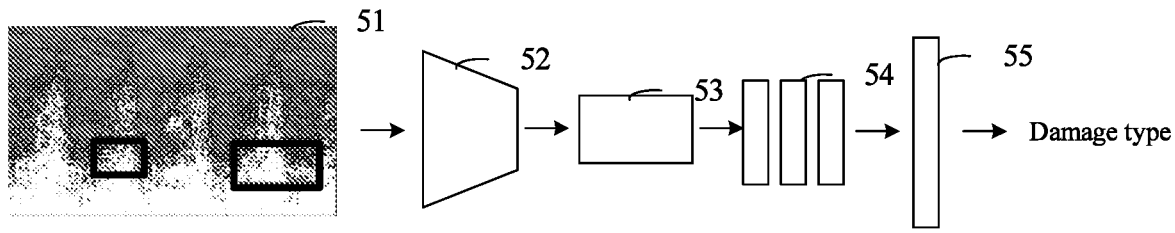
FIG. 5 is a flowchart of a method for recognizing a damage type according to one exemplary embodiment of the present disclosure.

Illustratively, as shown in FIG. 5, a flowchart for recognizing the frequency spectrogram based on the damage recognition model is shown. The background server inputs the frequency spectrogram 51 into a convolution and pooling layer 52 of the model, and maps the frequency spectrogram to a feature space by convolution and pooling to obtain an image feature of the frequency spectrogram; inputs the above image feature into a feature conversion layer 53 for feature conversion to obtain the converted image feature; then inputs the converted image feature into a fully-connected layer 54, and obtains a feature classification result by recognizing and classifying the converted image feature by the fully-connected layer 54; and finally obtains the damage recognition result by normalizing the feature classification result based on an output layer 55. The damage recognition result includes the damage type of the wind turbine blade.

It should be noted that the above damage recognition model is obtained by training a neural network model. Illustratively, a training process of the above damage recognition model is as follows.

1) A frequency spectrogram sample is acquired.

The frequency spectrogram sample is a frequency spectrogram set obtained by acquiring historical frequency spectrograms, and the frequency spectrogram sample set includes images corresponding to different damage types in different historical frequency spectrograms. Damage positions and sample damage types are correspondingly marked in the above frequency spectrogram sample.

2) The frequency spectrogram sample is input into the neural network model for image recognition to obtain the recognized damage type of the damage position.

The background server inputs the acquired frequency spectrogram sample into the neural network model for obtaining the determined damage type corresponding to each damage position by performing image recognition on the frequency spectrogram sample based on the neural network model.

In some embodiments, the above neural network model may be a long short-term memory model, a convolutional neural network model, a feedforward neural network model or the like. The type of the neural network model is not limited in this embodiment.

3) Error back propagation training is performed based on the recognized damage type and the sample damage type to train a recognition capacity of the neural network model against the damage type of the wind turbine blade, and hence the damage recognition model is obtained.

The neutral network model calculates an error between the recognized damage type and the sample damage type, performs error back propagation, and adjusts its own model parameter. Thus, the recognition capacity of the neural network model against the damage type of the wind turbine blade is trained and finally the damage recognition model is obtained.

In summary, in the method for inspecting the wind turbine blade according to the present disclosure, the sound signal generated by the impingement of the wind on the wind turbine blade is acquired using the sound acquisition device;

the frequency spectrogram corresponding to the sound signal is generated; and the damage recognition result of the wind turbine blade is obtained from the frequency spectrogram by performing image recognition on the frequency spectrogram based on the damage recognition model. Thus, the damage type of the wind turbine blade is accurately recognized based on the frequency spectrogram without manual inspection. Therefore, human resources are saved. In addition, the health state of the wind turbine blade can be monitored in real time. Moreover, in this method, the damage of the wind turbine blade is recognized based on the sound signal without depending on any wind turbine operating data, such that the machine calculation amount during the detection of the damage of the wind turbine blade is reduced.

Figure 6:
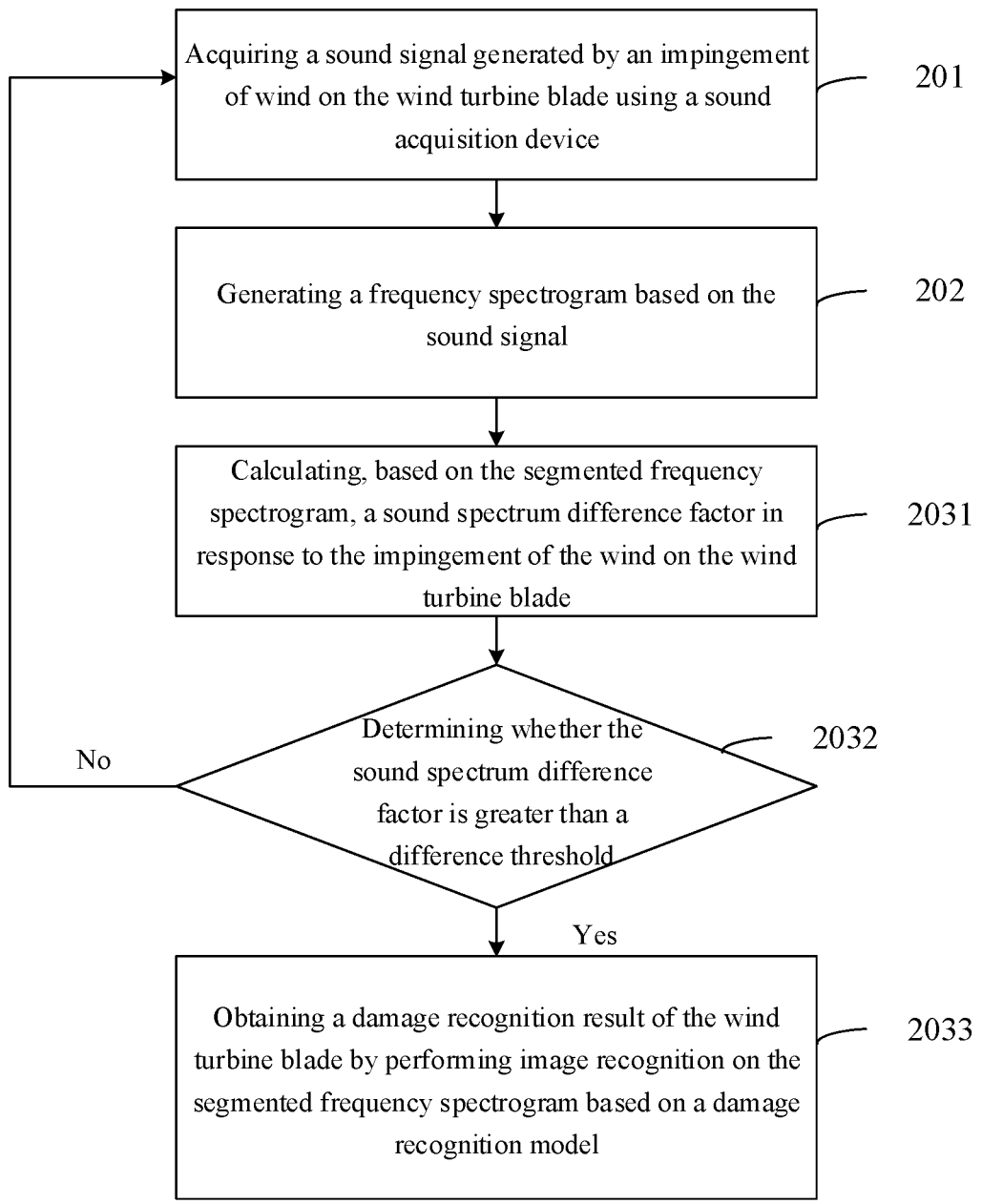
FIG. 6 is a flowchart of a method for inspecting a wind turbine blade according to another exemplary embodiment of the present disclosure.

It should be noted that the method for inspecting the wind turbine blade according to the present disclosure is to find the damage of the wind turbine blade immediately in the process that the wind turbine blades rotates, and confirm the damage type. Therefore, before the damage type of the wind turbine blade is recognized, it is possible to determine firstly whether the wind turbine blade is damaged. Illustratively, based on FIG. 2, step 203 may include sub-steps 2031 and 2032. As shown in FIG. 6, the steps are as follows.

In sub-step 2031, a sound spectrum difference factor in response to the impingement of the wind on the wind turbine blade is calculated based on the segmented frequency spectrogram.

The above sound spectrum difference factor represents the damage degree of the wind turbine blade. In some embodiments, the sound spectrum difference factor in response to the impingement of the wind on the wind turbine blade is calculated based on the segmented frequency spectrogram.

In some embodiments, the segmented frequency spectrogram includes frequency spectrum regions of n wind turbine blades after segmentation, where n is a positive integer. Illustratively, exemplary steps that the background server calculates, based on the frequency spectrum regions of the n wind turbine blades, the sound spectrum difference factor in response to the impingement of the wind on the wind turbine blade are as follows.

1) Signal peaks in the n frequency spectrum regions are extracted.

2) A time domain factor and a frequency domain factor of the sound signal are calculated based on the signal peaks of the n frequency spectrum regions.

Specifically, m wind turbine blades are disposed on the wind power generation device. In some embodiments, the background server calculates the time domain factor of the sound signal: the background server firstly determines a median of signal peaks of at least two of the frequency spectrum regions corresponding to each of the wind turbine blades; next determines a maximum peak and a minimum peak from m medians corresponding to the m wind turbine blades; and finally determines a ratio of the maximum peak to the minimum peak as the time domain factor.

Illustratively, if m is 3, the background server chooses the curve on certain frequency band in the frequency spectrogram to calculate the time domain factor. For example, the background server chooses the curve on the frequency band of (−0.008)–(−0.006) in the frequency spectrogram 41 shown in FIG. 4 to calculate the time domain factor, or chooses the curve of the sound signal on the whole frequency band (not shown) to calculate the time domain factor. The wind turbine blades include three wind turbine blades. If 25 frequency spectrum regions are included in the selected curve, the background server determines a signal peak in each frequency spectrum region, with a total of 25 signal peaks, in which 9 signal peaks are signal peaks of the wind turbine blade A in the corresponding $(3m-2)^{th}$ frequency spectrum region, 8 signal peaks are signal peaks of the wind turbine blade B in the corresponding $(3m-1)^{th}$ frequency spectrum region, and 8 signal peaks are signal peaks of the wind turbine blade C in the corresponding $3m^{th}$ frequency spectrum region. The background server determines corresponding medians a, b and c from the signal peaks of the wind turbine blades A, B and C, determines the maximum peak and the minimum peak from the medians a, b and c, and finally determines the ratio of the maximum peak to the minimum peak as the time domain factor. For example, if the maximum peak is a and the minimum peak is c, the time domain factor is a/c.

In some embodiments, the background server calculates the frequency domain factor of the sound signal: the background server firstly acquires the maximum peak from signal peaks of each two adjacent frequency spectrum regions of m frequency spectrum regions and determines the maximum peak as a candidate peak; and then determines a median of at least two of the candidate peaks as the frequency domain factor; or the background server calculates a relative entropy, i.e., Kullback-Leibler (KL) divergence, between signal distribution and theoretical distribution in the segmented frequency spectrogram, and determines the KL divergence as the frequency domain factor.

Illustratively, as shown in FIG. 4, the background server marks the 25 frequency spectrum regions as 1 to 25 from left to right, acquires the maximum peaks from the corresponding signal peaks of adjacent frequency spectrum regions 1-3, 2-4, 3-5, . . . , 23-25, with a total of 23 signal peaks, and determines the median from the above 23 signal peaks. This median is one frequency domain factor.

The background server calculates the KL divergence between signal distribution and theoretical signal distribution in the segmented frequency spectrogram, and determines the KL divergence as another frequency domain factor.

It should be noted that the above frequency domain factor represents a distribution feature of the sound signal in a frequency domain. The present disclosure provides two methods for calculating the distribution feature of the sound signal in the frequency domain, but in the present disclosure, the method for calculating the distribution feature of the sound signal in the frequency domain is not limited to the two methods provided above.

3) A weighted average of the time domain factor and the frequency domain factor is determined as the sound spectrum difference factor.

Illustratively, the background server obtains one time domain factor and two frequency domain factors by calculation, then calculates the weighted average of the one time domain factor and the two frequency domain factors, and determines the above weighted average as the sound spectrum difference factor.

It should also be noted that the background server further filters the sound signal by a filter to obtain the filtered sound signal, generates the frequency spectrogram based on the filtered sound signal and then generates the frequency spectrum difference factor.

In sub-step 2032, whether the sound spectrum difference factor is greater than a difference threshold is determined.

The difference threshold is disposed in the background server and is configured to determine whether the wind turbine blade is damaged. In the case that the sound spectrum difference factor is greater than the difference threshold, the wind turbine blade is damaged and sub-step 2033 is performed; and in the case that the sound spectrum difference factor is less than or equal to the difference threshold, the wind turbine blade is not damaged and the process returns to step 201.

In sub-step 2033, the damage recognition result of the wind turbine blade is obtained by performing image recognition on the segmented frequency spectrogram based on the damage recognition model.

In summary, in the method for inspecting the wind turbine blade according to this embodiment, before the damage type of the wind turbine blade is recognized, firstly whether the wind turbine blade is damaged is determined based on the sound spectrum difference factor; and when it is determined that the wind turbine blade is damaged, the damage type is recognized. Thus, the probability of recognizing the damage type based on the damage recognition model is increased, and the invalid recognition of the damage type of the wind turbine blade by the damage recognition model is avoided.

It should also be noted that a range threshold may also be set in the background server and different range thresholds correspond to different damage degrees. In the case that the sound spectrum difference factor is greater than the difference threshold, the background server determines the damage degree of the wind turbine blade based on the range threshold to which the sound spectrum difference factor belongs.

Illustratively, a first range threshold, a second range threshold and a third range threshold are set in the background server. When the sound spectrum difference factor belongs to the first range threshold, the background server determines that the damage degree of the wind turbine blade is mild; when the sound spectrum difference factor belongs to the second range threshold, the background server determines that the damage degree of the wind turbine blade is moderate; and when the sound spectrum difference factor belongs to the third range threshold, the background server determines that the damage degree of the wind turbine blade is severe. Values in the range threshold are greater than the difference threshold.

The background server outputs the damage degree of the wind turbine blade while outputting the damage type of the wind turbine blade. Optionally, the output damage degree may be determined by the background server based on set damage degree levels, or may be the sound spectrum difference factor directly.

With this method, a user can clearly know the damage degree and the damage type of the wind turbine blade from the output result.

It should also be noted that in the process that the background server executes the method for inspecting the wind turbine blade, the sound acquisition device acquires the sound signal with a preset duration every time, and correspondingly generates a file for storing the above sound signal with the preset duration. For example, each file includes the sound signal with the duration of 43 seconds. When calculating the sound spectrum difference factor, the background server acquires the sound signal with the duration of 43 seconds from one file. However, the signal quality of the sound signals stored in the above various files is different, and there are some files, in which the overall signal quality is poor. This affects the result of the sound spectrum difference factor. Therefore, in the process of the calculating the sound spectrum difference factor, the background server firstly determines the signal quality of the sound signal.

Illustratively, after the segmented frequency spectrogram is obtained, the background server determines the signal quality of the sound signal based on the segmented frequency spectrogram as follows.

(1) A signal-to-noise ratio of the sound signal is calculated based on the segmented frequency spectrogram.

The sound acquisition device acquires an original sound signal generated by the impingement of the wind on the wind turbine blade. In an acquisition process, an additional signal, i.e., noise that is not present in the original sound signal is mixed into the original sound signal. The signal-to-noise ratio refers to a ratio of the acquired original sound signal to the noise. After the segmentation of the frequency spectrogram is completed, the background server calculates the signal-to-noise ratio of the sound signal based on the segmented frequency spectrogram.

(2) Whether the signal-to-noise ratio is greater than a signal-to-noise ratio threshold is determined.

The signal-to-noise ratio threshold is set in the background server and the background server determines whether the signal-to-noise ratio is greater than the signal-to-noise ratio threshold. In the case that the signal-to-noise ratio is greater than the signal-to-noise ratio threshold, step (3) is performed; and in the case that the signal-to-noise ratio is less than or equal to the signal-to-noise ratio threshold, step (4) is performed and the process returns to step 201.

(3) The sound spectrum difference factor in response to the impingement of the wind on the wind turbine blade is calculated based on the segmented frequency spectrogram.

(4) It is determined that the sound acquisition device encounters a failure.

In the wind power generation system, the sound signal generated by the impingement of the wind on the wind turbine blade is acquired using the sound acquisition device and a communication state of the sound acquisition device directly affects the quality of the acquired sound signal. Therefore, the background server detects the communication state of the sound acquisition device. Illustratively, the background server detects the communication state of the sound acquisition device in real time based on the signal quality of the acquired sound signal. For example, the background server determines the communication state of the sound acquisition device based on the signal-to-noise ratio of the acquired sound signal, or presence or absence of the sound signal. When there is the sound signal and the sound signal has high quality, it indicates that the sound acquisition device is in a health state. When there is no sound signal or the sound signal is poor, it indicates that the sound acquisition device is in an unhealth state and needs to be maintained to ensure the quality of the acquired sound signal. Therefore, the damage condition of the wind turbine blade can be determined accurately.

With an example that the health state of the sound acquisition device is detected based on the signal-to-noise ratio, in the case that the signal-to-noise ratio is less than or equal to the signal-to-noise ratio threshold, there is a large amount of noise in the sound signal acquired using the sound acquisition device and the sound signal has poor quality, and thus it is determined that the sound acquisition device encounters the failure; and in the case that the signal-to-noise ratio is not less than or equal to the signal-to-noise ratio threshold, the sound acquisition device is in the health state. It should also be noted that there is randomness when the signal-to-noise ratio is less than the signal-to-noise ratio threshold at one time. Therefore, if it is determined that the signal-to-noise ratio calculated after sound signals are reacquired for i consecutive times is less than the signal-to-noise ratio threshold, it is determined that the sound acquisition device encounters the failure, where i is a positive integer.

In summary, in the method for inspecting the wind turbine blade according to this embodiment, it is ensured that the sound signal for calculating the sound spectrum difference factor has high quality based on the quality detection of the sound signal. Thus, the accuracy of the calculated sound spectrum difference factor is ensured. In addition, in this method, the health state of the sound acquisition device is monitored in real time, such that the user can immediately know when the sound acquisition device is abnormal and then performs maintenance.

It should also be noted that an alarm system is further disposed in the background server. When the background server recognizes that the wind turbine blade is damaged, the background server gives an alarm. When the background server determines that the sound acquisition device is abnormal, the background server gives an alarm.

In some embodiments, different damage types of the wind turbine blade correspond to different alarms and the background server gives a corresponding alarm based on the damage type of the wind turbine blade.

In this method, when the damage of the wind turbine blade or the sound acquisition device is recognized, an alarm is given immediately to warn the user about maintenance punctually. As such, the device may be repaired punctually and greater loss is avoided.

Figure 7:
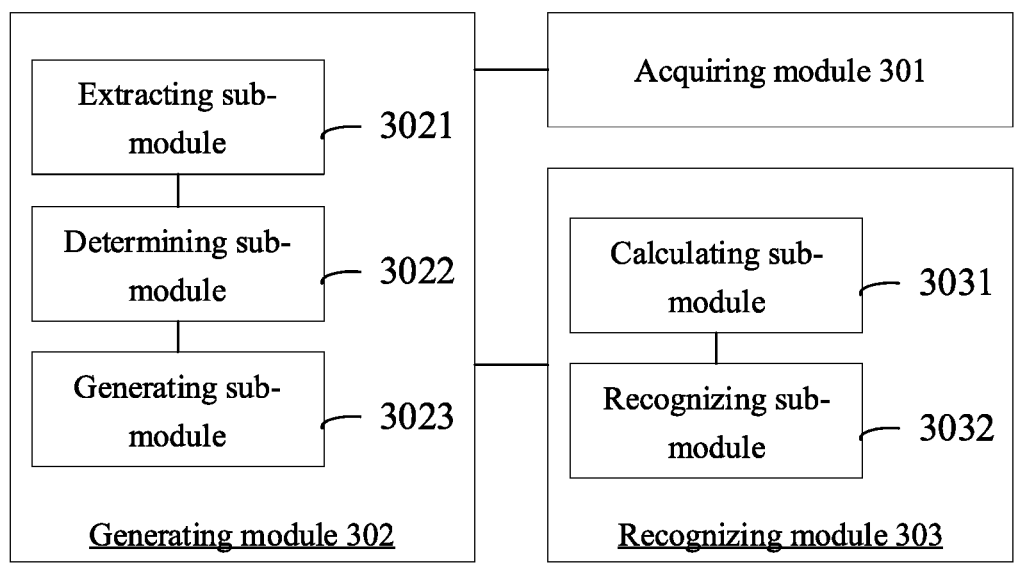
FIG. 7 is a block diagram of an apparatus for inspecting a wind turbine blade according to one exemplary embodiment of the present disclosure.

Referring to FIG. 7, a block diagram of an apparatus for inspecting a wind turbine blade according to one exemplary embodiment of the present disclosure is shown. The wind turbine blade is a blade in a wind power generation device and the wind power generation device further includes a tower provided with a sound acquisition device. The apparatus is implemented as all or part of a server by software, hardware, or a combination thereof.

The apparatus includes: an acquiring module or sound acquirer 301, configured to acquire a sound signal generated by an impingement of wind on the wind turbine blade using the sound acquisition device, wherein the sound signal includes a sound signal generated by sliding of air between blades in the case that the wind impinges on the wind turbine blade; a generation module or frequency spectrogram generator 302, configured to generate a frequency spectrogram based on the sound signal; and a recognition module or damage recognizer 303, configured to obtain a damage recognition result of the wind turbine blade by performing image recognition on the frequency spectrogram based on a damage recognition model, wherein the damage recognition model is obtained by training a neural network model.

In some embodiments, the generation module 302 includes: an extraction sub-module 3021, configured to extract a signal envelope from a time domain signal formed by the sound signal by calling a signal analysis algorithm; a determination sub-module 3022, configured to determine a position of a point, where a wave trough appears on the signal envelope, in the time domain as a segmentation point; and a generation sub-module 3023, configured to convert the sound signal into the frequency spectrogram, and segment the frequency spectrogram based on the segmentation point to obtain the segmented frequency spectrogram.

In some embodiments, the recognition module 303 includes: a calculation sub-module 3031, configured to calculate, based on the segmented frequency spectrogram, a sound spectrum difference factor in response to the impingement of the wind on the wind turbine blade, wherein the sound spectrum difference factor represents a damage degree of the wind turbine blade; and a recognition sub-module 3032, configured to obtain the damage recognition result of the wind turbine blade by performing image recognition on the segmented frequency spectrogram based on the damage recognition model in the case that the sound spectrum difference factor is greater than a difference threshold.

In some embodiments, the segmented frequency spectrogram includes frequency spectrum regions of n wind turbine blades after segmentation, where n is a positive integer.

The calculation sub-module 3031 is configured to extract signal peaks in the n frequency spectrum regions; calculate a time domain factor and a frequency domain factor of the sound signal based on the signal peaks of the n frequency spectrum regions; and determine a weighted average of the time domain factor and the frequency domain factor as the sound spectrum difference factor.

In some embodiments, m wind turbine blades are disposed on the wind power generation device, where m is a positive integer.

The calculation sub-module 3031 is configured to determine a median of signal peaks of at least two of the frequency spectrum regions corresponding to each of the wind turbine blades; determine a maximum peak and a minimum peak from m medians corresponding to the m wind turbine blades; and determine a ratio of the maximum peak to the minimum peak as the time domain factor.

In some embodiments, m wind turbine blades are disposed on the wind power generation device, where m is a positive integer.

The calculation sub-module 3031 is configured to acquire the maximum peak from signal peaks of each m adjacent frequency spectrum regions and determine the maximum peak as a candidate peak, where m is a positive integer; and determine a median of at least two of the candidate peaks as the frequency domain factor; or calculate a relative entropy between signal distribution and theoretical distribution in the segmented frequency spectrogram, and determine the relative entropy as the frequency domain factor.

In some embodiments, the calculation sub-module 3031 is configured to calculate a signal-to-noise ratio of the sound signal based on the segmented frequency spectrogram; calculate, based on the segmented frequency spectrogram, the sound spectrum difference factor in response to the impingement of the wind on the wind turbine blade in the case that the signal-to-noise ratio is greater than a signal-to-noise ratio threshold; and determine that the sound acquisition device encounters a failure in the case that the signal-to-noise ratio is less than the signal-to-noise ratio threshold.

In summary, in the apparatus for inspecting the wind turbine blade according to this embodiment, the sound signal generated by the impingement of the wind on the wind turbine blade is acquired using the sound acquisition device; the frequency spectrogram corresponding to the sound signal is generated; and the damage recognition result of the wind turbine blande is obtained from the frequency spectrogram by performing image recognition on the frequency spectrogram based on the damage recognition model. Thus, the damage type of the wind turbine blade is accurately determined based on the frequency spectrogram without manual inspection. Therefore, human resources are saved. In addition, the health state of the wind turbine blade can be monitored in real time. Moreover, in the apparatus, the damage of the wind turbine blade is recognized based on the sound signal without depending on any wind turbine operating data. Thus, the machine calculation amount during the detection of the damage of the wind turbine blade is reduced.

Figure 8:
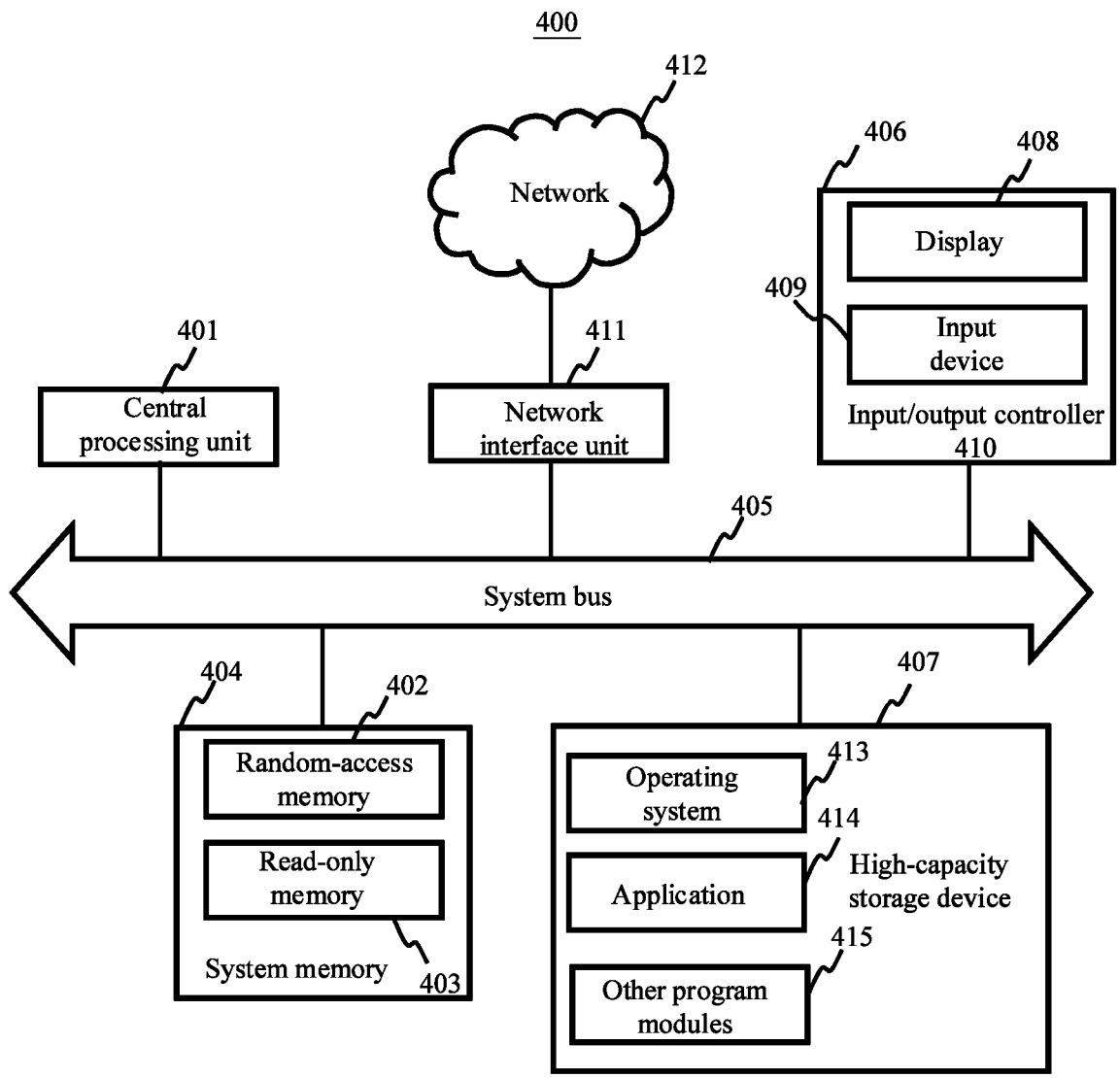
FIG. 8 is a structural diagram of a server according to one exemplary embodiment of the present disclosure.

Referring to FIG. 8, a structural diagram of a server according to one exemplary embodiment of the present disclosure is shown. The server is configured to perform the method for inspecting the wind turbine blade according to the above embodiment.

Specifically, the server 400 includes a central processing unit (CPU) 401, a system memory 404 including a random-access memory (RAM) 402 and a read-only memory (ROM) 403, and a system bus 405 connecting the system memory 404 and the central processing unit 401. The server 400 further includes a basic input/output system (I/O system) 406 which helps information transmission between various components within a computer, and a high-capacity storage device 407 for storing an operating system 413, an application 414 and other program modules 415.

The basic input/output system 406 includes a display 408 for displaying information and an input device 409, such as a mouse and a keyboard, for inputting information by a user. Both the display 408 and the input device 409 are connected to the central processing unit 401 by an input/output controller 410 connected to the system bus 405. The basic input/output system 406 may further include the input/output controller 410 for receiving and processing input from a plurality of other devices, such as the keyboard, the mouse, or an electronic stylus. Similarly, the input/output controller 410 further provides output to the display, a printer, or other types of output devices.

The high-capacity storage device 407 is connected to the central processing unit 401 by a high-capacity storage controller (not shown) connected to the system bus 405. The high-capacity storage device 407 and a computer-readable medium associated therewith provide non-volatile storage for the server 400. That is, the high-capacity storage device 407 may include the computer-readable medium (not shown), such as a hard disk or a compact disc read-only memory (CD-ROM) driver.

Without loss of generality, the computer-readable medium may include a computer storage medium and a communication medium. The computer storage medium includes volatile and non-volatile, removable and non-removable media implemented in any method or technology for storage of information such as a computer-readable instruction, a data structure, a program module or other data. The computer storage medium includes a RAM, a ROM, an erasable programmable read-only memory (EPROM), an electrically erasable programmable read-only memory (EEPROM), a flash memory or other solid-state storage devices; a CD-ROM, a digital versatile disc (DVD) or other optical storage devices; and a tape cartridge, a magnetic tape, a disk storage or other magnetic storage devices. A person skilled in the art would know that the computer storage medium is not limited to above ones. The above system memory 404 and the high-capacity storage device 407 may be collectively referred to as the memory.

According to various embodiments of the present disclosure, the server 400 may also be connected to a remote computer on a network over the network, such as the Internet, for operation. That is, the server 400 may be connected to the network 412 by a network interface unit 411 connected to the system bus 405, or may be connected to other types of networks or remote computer systems (not shown) with the network interface unit 411.

Serial numbers of the above embodiments of the present disclosure are only for the purpose of description, but do not represent the quality of the embodiments.

A person of ordinary skill in the art may understand that all or part of the steps in the above embodiments can be completed by hardware, or by relevant hardware instructed by a program stored in a computer-readable storage medium, such as a read-only memory, a disk, or an optical disc.

Described above are example embodiments of the present disclosure, and are not intended to limit the present disclosure. Any modifications, equivalent replacements, improvements and the like made within the spirit and principles of the present disclosure should be included within the scope of protection of the present disclosure.

What is claimed is:

1. A method for inspecting a wind turbine blade, wherein the wind turbine blade is a blade in a wind power generation device, the wind power generation device further comprising a tower provided with a sound acquisition device that is mounted away from the wind turbine blade; wherein the method comprises:
   acquiring, via the sound acquisition device, a sound signal in response to an impingement of wind on the wind turbine blade, wherein the sound signal comprises a sound signal generated by sliding of air between blades in the case that the wind impinges on the wind turbine blade;
   extracting a signal envelope from a time domain signal diagram formed by the sound signal by calling a signal analysis algorithm;
   determining a position of a point, where a wave trough appears on the signal envelope, in a time domain as a segmentation point; and
   converting the sound signal into a frequency spectrogram, and obtaining a segmented frequency spectrogram by segmenting the frequency spectrogram based on the segmentation point; and
   obtaining a damage recognition result of the wind turbine blade by performing image recognition on the segmented frequency spectrogram based on a damage recognition model, wherein the damage recognition model is obtained by training a neural network model.

2. The method according to claim 1, wherein obtaining the damage recognition result of the wind turbine blade by performing image recognition on the segmented frequency spectrogram based on the damage recognition model comprises:
   calculating a sound spectrum difference factor in response to the impingement of wind on the wind turbine blade based on the segmented frequency spectrogram, wherein the sound spectrum difference factor represents a damage degree of the wind turbine blade; and
   obtaining the damage recognition result of the wind turbine blade by performing image recognition on the segmented frequency spectrogram based on the damage recognition model in the case that the sound spectrum difference factor is greater than a difference threshold.

3. The method according to claim 2, wherein the segmented frequency spectrogram comprises frequency spectrum regions of n wind turbine blades after segmentation, where n is a positive integer; and
   calculating the sound spectrum difference factor in response to the impingement of the wind on the wind turbine blade based on the segmented frequency spectrogram comprises:
   extracting signal peaks in n frequency spectrum regions;
   calculating a time domain factor and a frequency domain factor of the sound signal based on the signal peaks of the n frequency spectrum regions; and determining a weighted average of the time domain factor and the frequency domain factor as the sound spectrum difference factor.

4. The method according to claim 3, wherein m wind turbine blades are disposed on the wind power generation device, where m is a positive integer; and
calculating the time domain factor of the sound signal based on the signal peaks of the n frequency spectrum regions comprises:
determining a median of signal peaks of at least two of the frequency spectrum regions corresponding to each of the wind turbine blades;
determining a maximum peak and a minimum peak from m medians corresponding to the m wind turbine blades; and
determining a ratio of the maximum peak to the minimum peak as the time domain factor.

5. The method according to claim 3, wherein m wind turbine blades are disposed on the wind power generation device, where m is a positive integer; and
calculating the frequency domain factor of the sound signal based on the signal peaks of the n frequency spectrum regions comprises:
acquiring a maximum peak from signal peaks of each two adjacent frequency spectrum regions of m frequency spectrum regions and determining the maximum peak as a candidate peak, where m is a positive integer; and determining a median of at least two of the candidate peaks as the frequency domain factor; or
calculating a relative entropy between signal distribution and theoretical distribution in the segmented frequency spectrogram, and determining the relative entropy as the frequency domain factor.

6. The method according to claim 2, wherein calculating the sound spectrum difference factor in response to the impingement of the wind on the wind turbine blade based on the segmented frequency spectrogram comprises:
calculating a signal-to-noise ratio of the sound signal based on the segmented frequency spectrogram;
calculating the sound spectrum difference factor in response to the impingement of the wind on the wind turbine blade based on the segmented frequency spectrogram in the case that the signal-to-noise ratio is greater than a signal-to-noise ratio threshold; and
determining that the sound acquisition device encounters a failure in the case that the signal-to-noise ratio is less than the signal-to-noise ratio threshold.

7. A server for inspecting a wind turbine blade, wherein the wind turbine blade is a blade in a wind power generation device, the wind power generation device further comprising a tower provided with a sound acquisition device that is mounted away from the wind turbine blade; and
the server comprises:
a sound acquirer, configured to acquire, via the sound acquisition device, a sound signal generated by an impingement of wind on the wind turbine blade, wherein the sound signal comprises a sound signal generated by sliding of air between blades in the case that the wind impinges on the wind turbine blade;
a frequency spectrum generator, configured to:
extract a signal envelope from a time domain signal diagram formed by the sound signal by calling a signal analysis algorithm;
determine a position of a point, where a wave trough appears on the signal envelope, in a time domain as a segmentation point; and
convert the sound signal into a frequency spectrogram, and obtain a segmented frequency spectrogram by segmenting the frequency spectrogram based on the segmentation point; and
a damage recognizer, configured to obtain a damage recognition result of the wind turbine blade by performing image recognition on the segmented frequency spectrogram based on a damage recognition model, wherein the damage recognition model is obtained by training a neural network model.

8. A wind power generation device, comprising:
a sound acquisition device;
a memory communicably connected to the sound acquisition device; and
a processor communicably connected to the memory; wherein
the sound acquisition device is configured to acquire a sound signal in response to an impingement of wind on a wind turbine blade of the wind power generation device, and store the sound signal in the memory;
the memory is configured to store an executable instruction and the sound signal; and
the processor is configured to load and execute the executable instruction stored in the memory to perform a method for inspecting the wind turbine blade, wherein the wind turbine blade is a blade in the wind power generation device, the wind power generation device further comprising a tower provided with the sound acquisition device that is mounted away from the wind turbine blade, the method comprising:
acquiring, via the sound acquisition device, a sound signal in response to an impingement of wind on the wind turbine blade, wherein the sound signal comprises a sound signal generated by sliding of air between blades in the case that the wind impinges on the wind turbine blade;
extracting a signal envelope from a time domain signal diagram formed by the sound signal by calling a signal analysis algorithm;
determining a position of a point, where a wave trough appears on the signal envelope, in a time domain as a segmentation point; and
converting the sound signal into a frequency spectrogram, and obtaining a segmented frequency spectrogram by segmenting the frequency spectrogram based on the segmentation point; and
obtaining a damage recognition result of the wind turbine blade by performing image recognition on the segmented frequency spectrogram based on a damage recognition model, wherein the damage recognition model is obtained by training a neural network model.

9. A non-transitory computer-readable storage medium storing at least one instruction, at least one program, a code set, or an instruction set therein, wherein the at least one instruction, the at least one program, the code set, or the instruction set, when loaded and executed by a processor, causes the processor to perform a method for inspecting a wind turbine blade, wherein the wind turbine blade is a blade in a wind power generation device, the wind power generation device further comprising a tower provided with a sound acquisition device that is mounted away from the wind turbine blade, the method comprising:
acquiring, via the sound acquisition device, a sound signal in response to an impingement of wind on the wind turbine blade, wherein the sound signal comprises a sound signal generated by sliding of air between blades in the case that the wind impinges on the wind turbine blade;

extracting a signal envelope from a time domain signal diagram formed by the sound signal by calling a signal analysis algorithm;

determining a position of a point, where a wave trough appears on the signal envelope, in a time domain as a segmentation point; and converting the sound signal into a frequency spectrogram, and obtaining a segmented frequency spectrogram by segmenting the frequency spectrogram based on the segmentation point; and obtaining a damage recognition result of the wind turbine blade by performing image recognition on the segmented frequency spectrogram based on a damage recognition model, wherein the damage recognition model is obtained by training a neural network model.

\* \* \* \* \*